United States Patent [19]
Sheehan

[11] Patent Number: 5,909,718
[45] Date of Patent: Jun. 8, 1999

[54] PARTICULATE ABSORBENT MATERIAL FROM WASTE PAPER

[75] Inventor: Richard W. Sheehan, Johnson City, Tenn.

[73] Assignee: Absorbent Paper Company, Inc., Johnson City, Tenn.

[21] Appl. No.: 08/867,848

[22] Filed: Jun. 3, 1997

[51] Int. Cl.$^6$ .......................... A01K 29/00; A01K 1/015
[52] U.S. Cl. .......................... 119/172; 502/439; 502/401; 264/500
[58] Field of Search .................... 119/28.5, 171, 119/172, 526; 502/400, 401, 439; 264/500

[56] References Cited

U.S. PATENT DOCUMENTS

| | | | |
|---|---|---|---|
| 3,789,797 | 2/1974 | Brewer . | |
| 4,263,873 | 4/1981 | Christianson . | |
| 4,341,180 | 7/1982 | Cortigene et al. . | |
| 4,374,794 | 2/1983 | Kok | 264/122 |
| 4,409,925 | 10/1983 | Brundrett et al. . | |
| 4,560,527 | 12/1985 | Harke et al. | 264/500 |
| 4,570,573 | 2/1986 | Lohman | 119/172 |
| 4,621,011 | 11/1986 | Fleischer et al. | 428/221 |
| 4,625,679 | 12/1986 | Hill . | |
| 4,723,509 | 2/1988 | Schaefer . | |
| 5,100,600 | 3/1992 | Keller et al. | 264/112 |
| 5,176,107 | 1/1993 | Buschur | 119/173 |
| 5,195,465 | 3/1993 | Webb et al. | 119/172 |
| 5,209,186 | 5/1993 | Dewing | 119/172 |
| 5,215,041 | 6/1993 | Krahenbuhl | 119/172 |
| 5,361,719 | 11/1994 | Kiebke | 119/171 |

*Primary Examiner*—Michael J. Carone
*Assistant Examiner*—James S. Bergin
*Attorney, Agent, or Firm*—Larson & Taylor

[57] ABSTRACT

A paper based particulate absorbent material and method of manufacture using shredded paper along with water and a binder mixture. In the first step of the process the waste paper is subjected to a size reduction treatment. In the second step, the paper is mixed with water and optionally a binder. The material exits the mixing apparatus which can be fully dried to produce a particulate absorbent material. This material can be used for litter material, box packing material, caulking filler and floor sweep. The product can be made to be similar in appearance to commercially available litter materials but is lighter, dust-free, biodegradable and extremely absorbent. The packing material can be made to bend but not crease. Further, the product is extremely economical since it is made out of waste paper.

6 Claims, No Drawings

1

PARTICULATE ABSORBENT MATERIAL FROM WASTE PAPER

BACKGROUND OF THE INVENTION

1. Field of the Invention

The present invention relates to a method of making a biodegradable particulate absorbent material which is especially adapted for use as animal litter, caulking filler material, packaging material or floor sweep and to the products of the method.

2. Description of the Prior Art

Several types of litter material are known. For example, litter materials made from clay, alfalfa, wood chips or sawdust and paper are known. Some of these materials have serious disadvantages when used as litter.

Clay, because of its high density, is very heavy and thus cannot be carried in large quantities by the consumer. Clay litter typically has a density of about 0.6 g/cc. Further, clay cannot be disposed of directly on a lawn or in the garden.

Alfalfa pellets also have serious deficiencies because these types of litter are edible by bacteria and thus tend to mold and develop unpleasant odors. U.S. Pat. No. 3,789,797 (Brewer) discloses a cat litter product prepared from an alfalfa base.

Litter made from sawdust or wood chips is ineffective because it has a wood odor that is unpleasant to many animals. In addition, these pellets are not very absorbent because they include lignin, wood tars and turpentines. An example of litter made from bark and fiber crumbs is disclosed in U.S. Pat. No. 3,980,050 (Neubauer).

U.S. Pat. No. 4,263,873 (Christianson) relates to an animal litter including a cellulose litter material which contains a pheromone attractant substance which makes the litter attractive to animals. The cellulose material is made from pelletized ground paper having a sufficient moisture content to hold the particles together. A significant disadvantage of this animal litter is that it requires many steps to produce as can be seen from FIG. 1 of this patent.

U.S. Pat. No. 4,621,011 (Fleischer et al) discloses a cellulosic particle especially useful as cat litter which is manufactured by agglomerating a fibrous cellulosic feed material in the presence of water, compacting the surface of the agglomerated particles and drying the particles. A significant disadvantage of this cat litter is that it also requires several steps to produce including fiberization by attrition, hydration, agglomeration and compaction.

U.S. Pat. No. 4,560,527 relates to a method of making agglomerated cellulosic particles which are useful as cat litters. The process comprises agglomerating a moist blend of fibers, aggregates of fibers and/or fiber-size pieces of fibrous cellulosic material in a substantially horizontal rotating drum to form agglomerated particles, compacting the surfaces of the particles and drying the particles. Again, this process requires numerous steps which render it costly and inefficient.

U.S. Pat. No. 4,570,573 relates to a cat litter composition which is absorbent, odorless, trackless and biodegradable. The cat litter composition comprises 60–94% by weight of a paper, 1–35% by weight gypsum and about 3–12% by weight of water. The composition is pelletized so that it may easily be disposed of by flushing it down the toilet. One disadvantage of this product is that it employs gypsum which tends to adhere to the cat who then leaves paw prints around the house. As a result, this cat litter must also be pelletized in order to prevent dusting.

Compacted and pelletized products are disadvantageous because they are costly to produce and, because they lack mechanical entanglement, these products tend to expand and fall apart when they are wet.

Other uses for the waste paper product of the invention are for making packaging material and floor sweep. A disadvantage of commercially available packaging material is that it easily creases or bends thus making it poor for packaging items such as art prints.

The present invention is directed to overcoming the deficiencies in the prior art, providing a very simple and easy way to produce inexpensive, biodegradable animal litter, packing material, floor sweep, and caulking filler material for wood, wallboard and plaster from waste paper products. Further, the present invention will help dispose of the glut of waste paper currently being collected by municipalities in successful recycling programs.

SUMMARY OF THE INVENTION

In a first aspect, the invention relates to a method for the preparation of a particulate absorbent material from waste paper. The method includes the steps of subjecting waste paper to a size reduction treatment, in a size reduction apparatus for a sufficient time to significantly reduce the size of the waste paper to small particles and then adding water and mixing the small particles of broken down waste paper in a mixing apparatus to bind some of the waste paper into larger particles. Subsequently, the particles are withdrawn from the mixing apparatus and dried to a final water content of about 1 to about 10 weight percent, based on the total weight of the particles, to produce a particulate absorbent material having a density of from about 0.02 to about 0.4 g/cc.

In another embodiment of the invention, a binder material is sprayed onto the particles after drying the waste paper or included in the water added to the mixing step. In this case, several different types of binder materials can be used depending upon the desired surface characteristics of the particulate absorbent material.

The invention also relates to a particulate absorbent material made by the method of the present invention and to cat litter, floor sweep, animal bedding, animal bed stuffing, caged animal litter and bird litter made by the process of the present invention.

In a further aspect, the invention relates to a process for the preparation of wood, wallboard or plaster filler or filler for making packaging material.

In this process, the waste paper is subjected to a size reduction treatment for a sufficient time to break down at least some of the waste paper to smaller particles and 100–600% by weight, based on the total weight of the waste paper, of water and a biodegradable binder are added and mixed with the broken down waste paper to provide a wood, wallboard or plaster filler. To provide a packaging material, the wet mixture of waste paper, water and biodegradable binder is compressed between two sheets of a paper material and dried. The present invention also includes the wood filler, wallboard filler, plaster filler and packing material.

The present inventor has surprisingly found that a very simple and straightforward method of manufacture can be used to produce a variety of acceptable litter materials which imitate existing litter materials using low grade waste paper as well as floor sweep, packing material, wood filler, wallboard or plaster filler.

DETAILED DESCRIPTION OF THE PREFERRED EMBODIMENTS

The invention relates, in a first aspect, to a method for making a number of different types of litter materials and floor sweep. The inventor has surprisingly found that by using a very simple process, a variety of different types of litter materials can be imitated using low grade waste paper as a starting material. This provides a simple, cost effective use for waste paper and results in a completely biodegradable litter material. Further, the material of the present invention has a much lower density than some of the prior art materials, particularly pelletized materials, thereby making it lighter and easier to handle. Also, since the material of the present invention is made of paper, it is very absorbent.

The waste paper products which can be used in the present invention may be selected from any types of waste paper such as newspaper, telephone book paper, magazines, low grade copy paper and high grade office paper, among others. The type of paper used influences the amount of mechanical work which is required in order to produce the end product. For instance, newspaper has a relatively weak fiber structure and thus can be processed quite easily. On the other hand, high grade office paper has a much stronger fiber structure and thus requires a greater amount of energy in order to obtain the same degree of breakdown. Magazine paper typically is coated with a clay coating layer on either side of the paper which must be permeated and mechanically ruptured in the process of the present invention. The most preferred paper for use in the present invention is newspaper due to its low cost and weak fiber structure. Of course, mixtures of different types of paper may also be used.

In the first step of the present process, the waste paper is fed to a size reduction apparatus to break the paper down to smaller particles. The paper can be broken down further to individual fibers, if desired. The size reduction apparatus may be an attrition device such as a hammermill or it may be a granulating apparatus. Conventional size reduction apparatus known to persons of ordinary skill in the art may also be used. The resulting broken down waste paper is fed to a mixing device for further processing.

The broken down waste paper used in the method of the present invention is mixed with about 100% to about 800% by weight of water, based on the weight of the waste paper for processing. More preferably, about 200% to about 400%, by weight of water based on the weight of the waste paper is employed. The amount of water employed has a significant effect on the final product. The more water that is employed, the greater the particle size of the final product. Thus, too much water should be avoided since it will produce large particles which are difficult to dry. On the other hand, too little water should be avoided since the subsequent mixing process will be adversely effected.

By controlling the amount of water added to the waste paper, the particle size and appearance of the end product can be controlled. This is one way to tailor the litter material of the present invention to the desired use. For example, when desiring to make cat litter, a different water content will be employed than when making bird litter since different particle sizes are desired.

An optional component of the litter material of the present invention is a biodegradable binder material. Typical biodegradable binder materials which can be employed in the present invention are polyvinyl acetate, polyvinyl alcohol, and styrene acrylic polymers such as J-74 and J-60 made by the S. C. Johnson Company and starch materials. These binder materials are generally water-resistant and are used to achieve the desired surface and aesthetic characteristics of the products. For example, cats scratch at their litter and associate the gravel sound therewith. Thus, a gravelly surface of the cat litter can be imitated by using a water-based binder in the absorbent product. Further, the biodegradable binder material increases the surface friction of the final product. This makes the final product less likely to be scratched out of the litter box and thus permits the litter to be of a lower density than many conventional litter materials. In this manner, commercially available cat litter and other litter materials can be imitated using waste paper as the main ingredient.

Other optional biodegradable materials can be used in the litter materials of the present invention. For example, non-hazardous conventional biodegradable coloring agents may be employed. In addition, for certain products it may be advantageous to employ other additives such as flame retardants and fragrance.

In the second step of the process of the present invention, a mixture of waste paper, water and optionally a binder are subjected to mixing for a period of time sufficient to cause sufficient fiber entanglement to produce the desired product. One of the advantages of the present invention is that by controlling the water content, mixing speed and mixing time of the process it is possible to produce products having a wide variety of sizes, which products can be made to closely approximate the sizes of typical litter products such as cat litter, caged animal litter and bird litter. In fact, there is a direct correlation between paper size, amount of water, mixing time, mixing speed and the ultimate mass size. In general, the higher the energy of the mixing operation, the more clearly defined are the shapes of the end product.

The binder material is not necessary to form the particles of the present invention. Rather, the particles of the present invention can be formed by adding water to the broken down waste paper, mixing the waste paper such that it begins to form masses. The combination of water and mechanical action cause the waste paper to bind by random mechanical entanglement of the fibers to produce particles with sufficient strength and mechanical integrity to render them suitable for a variety of end uses. The amount of energy required to reach this critical point will depend on a number of factors including the amount of water used, the type of paper used, the type of binder material and the type of mixing apparatus.

Suitable apparatus for use in the second step of the process of present invention include any conventional mixing apparatus. Preferred mixers are planetary mixers, twin-screw extruders and other similar conventional mixers. The type of apparatus used will affect the amount of mixing which will be required to arrive at the particular absorbent product desired and the ultimate shape of the product but is not critical to the process of the invention.

The binder material used in the process of the present invention is used for the purpose of providing desirable surface and aesthetic characteristics to the product. Thus, another method for tailoring the product for a particular application is to use a particular binder material or mixture of binder materials in order to provide the surface or aesthetic characteristics for that application.

The binder material can be added during the mixing step along with the water and the waste paper. In this instance, the binder material should be compatible with water to form either a solution or an emulsion. Another method of applying the binder material is to spray a mixture of the binder and a water carrier onto the particulate absorbent particles after they have been dried. The binder is used in such small quantities it has little or no effect on the absorbent quality of the products.

Generally, mixing can be accomplished in a period of 1–10 minutes depending on the mixing speed and type of mixing apparatus. As shown in the examples below, a variety of different types of products can be obtained by mixing for 5 to 10 minutes using different amounts of water and/or different sizes of waste paper starting materials.

After the mixing step, the particles are removed from the mixing apparatus and dried. Drying can be accomplished in, for example, a fluidized bed drying apparatus. Generally, the particulate absorbent material should be dried to a water content of about 1 to about 10 weight percent, based on the total weight of the final product. More preferably, the particulate absorbent material is dried to a water content of about 2 to about 5 weight percent, based on the total weight of the particulate absorbent material. The dried product will have a density of from about 0.02 to about 0.4 g/cc. More preferably, the density is about 0.03 to about 0.3 g/cc.

After the drying step, the surface and aesthetic characteristics of the particulate absorbent material can be altered by spraying on a water-based binder over the dried material to provide brittleness as an alternative to, or in addition to including a binder in the mixing step. The binders are used in small quantities of about 1 to about 10 weight percent, based on the total weight of the water used. More preferably, from about 2.5 to about 7.5 weight percent of binder, based on the weight of water, is used. The same amounts are used if the binder is incorporated into the mixing step. Spraying may be accomplished by any conventional spraying apparatus. Further, no pelletizing or compression step is required to produce an acceptable, non-dusting, litter material.

In a second aspect, the present invention relates to a process for producing a caulking filler, the caulking filler itself, a process of making a packaging material and to the packaging material. In this process, waste paper is first broken down by size reduction to a product as described above.

In the second step, the broken down waste paper is mixed with water and a biodegradable binder to form a caulking filler. About 100 to about 600 weight percent of a mixture of water and biodegradable binder are employed. Mixing may be accomplished by a planetary mixer, a twin-screw extruder, or any other conventional mixing apparatus. The mixing should be stopped once the ingredients are thoroughly mixed to form a paste. This paste can then be immediately used as a caulking material to fill cracks in wood, wallboard or plaster.

When fabricating a caulking filler material using the process of the present invention, it may be desirable to include a stiffening additive or chopped microfibers to enhance the physical integrity of the caulking filler. In this manner, the waste paper can be formed into a very inexpensive filler for large cracks.

A preferred additive is an emulsion or solution of a biodegradable binder such as polyvinyl acetate which can be used to provide the strength and durability required to use the products of the present invention as caulking filler and to fabricate box packaging material for packaging flat objects such as art prints. The polyvinyl acetate binder is preferably mixed with a plasticizer to provide the requisite flexibility of the filler when using it in flexible packaging material. Alternatively, a neoprene emulsion or a mixture of neoprene and a plasticizer may be used as the binder material. Using the present invention, a packaging material can be fabricated which will bend but not crease. To accomplish this, the dried filler must be flexible.

To make the packaging material of the invention, the same paste which may be used as a caulking filler, is fed between two sheets of a paper or Kraft paper material. Then the sheets are smoothed by, for example, by being passed under a blade through a small gap. After smoothing, the sheets are compressed by, for example, passing them between a pair of rollers. Finally, the sheets are dried.

The end product is a packing material which is flexible and thus will bend easily. However, the material will not crease or break easily and thus is well suited for packaging art prints or other flat objects and as separators used in packaging.

The invention will be further illustrated by the following examples.

EXAMPLE 1

Several different particulate absorbent materials were fabricated in accordance with the process of the present invention using a hammer mill type shearing apparatus and a granulator type shearing apparatus for the first step and a planetary mixer for the second step. The densities of the various sizes of the particles obtained from the mixer were measured and the results are given below.

| Screen Size | Typical Density |
|---|---|
| HAMMER MILL TYPE | |
| ½" | 34.6 gms/1,000 cc |
| ⅜" | 32.2 gms/1,000 cc |
| ¼" | 30.6 gms/1,000 cc |
| ⅛" | 34.6 gms/1,000 cc |
| 1/16" | 35.8 gms/1,000 cc |
| GRANULATOR TYPE | |
| ½" | 30.2 gms/1,000 cc |
| ¼" | 79.2 gms/1,000 cc |
| 3/16" | 103.8 gms/1,000 cc |
| ⅛" | 132.4 gms/1,000 cc |
| 3/32" | 210.2 gms/1,000 cc |

EXAMPLE 2

In this example it is demonstrated that the larger the amount of water that is employed in the mixing step, the larger the particles are that are obtained from the process.

Waste paper particles having the screen size indicated in Tables 1 and 2 were fed to either a hammer mill type shearing apparatus (Table 1) or to a granulator type shearing apparatus (Table 2). The amount of water added to the planetary mixer used in the mixing step was varied while holding the mixing speed, mixing time and sample weight constant. The size of the particles as shown in the right-hand column indicates that the more water that was added, the larger the particles that were obtained from the process. This demonstrates that controlling the amount of water added to the mixer can be used to control the particle size of the final absorbent material.

TABLE 1

Hammermill Type Paper

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| ½ | 40 | 10 | 150 | 100 | .110 |
| ½ | 40 | 10 | 150 | 200 | .210 |
| ⅜ | 40 | 10 | 150 | 100 | .130 |

TABLE 1-continued

Hammermill Type Paper

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 3/8 | 40 | 10 | 150 | 200 | .221 |
| 1/4 | 40 | 10 | 150 | 100 | .124 |
| 1/4 | 40 | 10 | 150 | 200 | .281 |
| 1/8 | 40 | 10 | 150 | 100 | .075 |
| 1/8 | 40 | 10 | 150 | 200 | .160 |
| 1/16 | 40 | 10 | 150 | 100 | .135 |
| 1/16 | 40 | 10 | 150 | 200 | .160 |

TABLE 2

Granular Type Paper

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 1/2 | 40 | 10 | 150 | 100 | .120 |
| 1/2 | 40 | 10 | 150 | 200 | .270 |
| 1/4 | 40 | 10 | 150 | 100 | .160 |
| 1/4 | 40 | 10 | 150 | 200 | .320 |
| 3/16 | 40 | 10 | 150 | 100 | .140 |
| 3/16 | 40 | 10 | 150 | 200 | .400 |
| 1/8 | 40 | 10 | 150 | 100 | .200 |
| 1/8 | 40 | 10 | 150 | 200 | .240 |
| 3/32 | 40 | 10 | 150 | 100 | .090 |
| 3/32 | 40 | 10 | 150 | 200 | .230 |

EXAMPLE 3

In this example, the same procedures were followed as in Example 2 except that the mixing speed and the amount of water were varied to demonstrate the wide range of particle sizes of the particulate absorbent material which can be obtained by the process of the present invention. Using half-inch screen size waste paper, particles ranging from 0.1 inch diameter to 0.845 inches in diameter were obtained in this example.

TABLE 3

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 1/2 | 40 | 10 | 150 | 100 | .110 |
| 1/2 | 40 | 10 | 150 | 150 | .150 |
| 1/2 | 40 | 10 | 150 | 200 | .210 |
| 1/2 | 40 | 10 | 150 | 250 | .320 |
| 1/2 | 40 | 10 | 150 | 300 | .480 |
| 1/2 | 40 | 10 | 200 | 100 | .108 |
| 1/2 | 40 | 10 | 200 | 150 | .160 |
| 1/2 | 40 | 10 | 200 | 200 | .329 |
| 1/2 | 40 | 10 | 200 | 250 | .408 |
| 1/2 | 40 | 10 | 200 | 300 | .845 |
| 1/2 | 40 | 10 | 300 | 100 | .088 |
| 1/2 | 40 | 10 | 300 | 150 | .122 |
| 1/2 | 40 | 10 | 300 | 200 | .235 |
| 1/2 | 40 | 10 | 300 | 250 | .436 |
| 1/2 | 40 | 10 | 300 | 300 | .703 |
| 1/2 | 40 | 10 | 400 | 100 | .100 |
| 1/2 | 40 | 10 | 400 | 150 | .112 |

TABLE 3-continued

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 1/2 | 40 | 10 | 400 | 200 | .175 |
| 1/2 | 40 | 10 | 400 | 250 | .335 |
| 1/2 | 40 | 10 | 400 | 300 | .610 |

EXAMPLE 4

Small particles on the order of the size of bird litter can also be obtained in accordance with the present invention as is shown in the table below. These results were obtained by using the procedure of Example 2.

TABLE 4

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 3/32 | 50 | 10 | 150 | 75 | .075 |
| 3/32 | 50 | 10 | 150 | 100 | .080 |
| 3/32 | 50 | 10 | 150 | 125 | .140 |
| 3/32 | 50 | 10 | 150 | 150 | .145 |
| 3/32 | 50 | 10 | 200 | 75 | .078 |
| 3/32 | 50 | 10 | 200 | 100 | .108 |
| 3/32 | 50 | 10 | 200 | 125 | .120 |
| 3/32 | 50 | 10 | 200 | 150 | .130 |
| 3/32 | 50 | 10 | 300 | 75 | .080 |
| 3/32 | 50 | 10 | 300 | 100 | .090 |
| 3/32 | 50 | 10 | 300 | 125 | .104 |
| 3/32 | 50 | 10 | 300 | 150 | .107 |

EXAMPLE 5

This example demonstrates that it is possible to fine-tune any particular size of a particulate absorbent material by adjusting the amount of water, the mixing time, the mixing speed and the specific paper size employed as a starting material. These results were obtained by using the procedure of Example 2.

TABLE 5

Hammermill Type Paper

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 1/8 | 50 | 10 | 150 | 75 | .090 |
| 1/8 | 50 | 10 | 150 | 100 | .122 |
| 1/8 | 50 | 10 | 150 | 125 | .132 |
| 1/8 | 50 | 10 | 150 | 150 | .134 |
| 1/8 | 50 | 10 | 150 | 175 | .136 |
| 1/8 | 50 | 10 | 200 | 75 | .120 |
| 1/8 | 50 | 10 | 200 | 100 | .123 |
| 1/8 | 50 | 10 | 200 | 125 | .133 |
| 1/8 | 50 | 10 | 200 | 150 | .137 |
| 1/8 | 50 | 10 | 200 | 175 | .140 |
| 1/8 | 50 | 10 | 300 | 75 | .095 |
| 1/8 | 50 | 10 | 300 | 100 | .097 |
| 1/8 | 50 | 10 | 300 | 125 | .102 |
| 1/8 | 50 | 10 | 300 | 150 | .106 |
| 1/8 | 50 | 10 | 300 | 175 | .110 |

TABLE 6

Granulator-Type Paper

| SCREEN SIZE (inches) | SAMPLE WEIGHT (grams) | MIX TIME (minutes) | MIX SPEED (rpm) | WATER LEVEL (ml) | MASS SIZE DIAMETER (inches) |
|---|---|---|---|---|---|
| 1/8 | 50 | 5 | 150 | 75 | .109 |
| 1/8 | 50 | 5 | 150 | 100 | .115 |
| 1/8 | 50 | 5 | 150 | 125 | .117 |
| 1/8 | 50 | 5 | 150 | 150 | .118 |
| 1/8 | 50 | 5 | 150 | 175 | .124 |
| 1/8 | 50 | 5 | 200 | 75 | .108 |
| 1/8 | 50 | 5 | 200 | 100 | .109 |
| 1/8 | 50 | 5 | 200 | 125 | .111 |
| 1/8 | 50 | 5 | 200 | 150 | .120 |
| 1/8 | 50 | 5 | 200 | 175 | .122 |
| 1/8 | 50 | 5 | 300 | 75 | .106 |
| 1/8 | 50 | 5 | 300 | 100 | .107 |
| 1/8 | 50 | 5 | 300 | 125 | .110 |
| 1/8 | 50 | 5 | 300 | 150 | .112 |
| 1/8 | 50 | 5 | 300 | 175 | .121 |

The foregoing examples were presented for the purpose of illustration and description only and are not to be construed as limiting the invention in any way. The scope of the invention is to be determined from the claims appended hereto.

What is claimed is:

1. A method for the preparation of a particulate absorbent material from waste paper comprising the steps of:

(a) subjecting waste paper to a size reduction treatment for a sufficient time to break down said waste paper to small particles, (b) mixing the broken down waste paper with from about 200 to about 800 weight percent of water to bind some fibers of said waste paper into particles by mechanical entanglement;

(c) drying the particles of waste paper to a final water content of about 1 to about 10 weight percent, based on the total weight of the composition to produce a particulate absorbent material having a density of from about 0.02 to about 0.4 g/cc.

2. A method as claimed in claim 1 wherein, in addition to the water, about 1.0 to about 10.0 weight percent, based on the weight of the water, of a biodegradable binder is mixed with the broken down waste paper and water.

3. A method as claimed in claim 2 wherein the binder is selected from the group consisting of polyvinyl acetate, polyvinyl alcohol and starches.

4. A method as claimed in claim 1 wherein the waste paper comprises newspaper.

5. A method as claimed in claim 1 wherein the particles have a diameter of from about 0.05 to about 2.0 centimeters.

6. A product produced by the process of claim 1.

* * * * *